United States Patent Office 3,840,576
Patented Oct. 8, 1974

---

3,840,576
PREPARATION OF COMPLEX ALUMINUM COMPOUNDS AND ALKYL PHOSPHORUS HALIDES
Harold Coates, Wombourne, England, and Derek Morris Holt Waring, Orange, Tex., assignors to Minister of Supply in Her Majesty's Government of the United Kingdom of Great Britain and Northern Ireland, London, England
No Drawing. Filed Aug. 8, 1952, Ser. No. 303,431
Claims priority, application Great Britain, Aug. 9, 1951, 18,813/51
Int. Cl. C07f 5/06, 9/28
U.S. Cl. 260—448 A          12 Claims This invention relates to the manufacture of organic phosphorus compounds and more particularly to complex compounds comprising alkyl phosphorous chlorides and aluminum chloride and analogous complex compounds, and also to the production of derivatives of the complex compounds, one aim of the invention being to produce alkyl phosphorus compounds in an economical manner without wasteful by-products.

It is known that aluminium may be reacted with an alkyl chloride to produce an equimolecular mixture of an alkyl aluminium dichloride and a dialkyl aluminium chloride, and that the mixture produced may be reacted with anhydrous aluminium chloride to convert the dialkyl compounds into the monoalkyl dichloride. These reactions when methyl chloride is used are indicated as follows:

$$2Al + 3CH_3Cl \rightarrow CH_3AlCl_2 + (CH_3)_2AlCl \qquad (1)$$

$$CH_3AlCl_2 + (CH_3)_2AlCl + AlCl_3 \rightarrow 3CH_3AlCl_2 \qquad (2)$$

We have discovered that phosphorus trichloride can be reacted with an alkyl aluminium chloride especially methyl aluminium dichloride to produce a complex or additive compound comprising an alkyl phosphorus halide-aluminium chloride complex.

Accordingly, the present invention provides a process for the manufacture of complex compounds comprising an alkyl phosphorus dihalide and an aluminium halide by the reaction of a phosphorus trihalide with an alkyl aluminium halide.

Thus, for example, a complex compound comprising an alkyl phosphorus dichloride and aluminium trichloride may be produced by the reaction of phosphorus trichloride with an alkyl aluminium chloride. The alkyl aluminium chloride may be a monoalkyl aluminium dichloride or a dialkyl aluminium chloride, or an equimolecular mixture of the monoalkyl and dialkyl chlorides, the so-called sesquichloride.

Moreover, in accordance with the invention, these complex compounds comprising an alkyl phosphorus dihalide and aluminium halide may be employed for the production of alkyl phosphorus halides. The alkyl phosphorus halides contain a carbon-phosphorus bond which is an important characteristic and renders them very suitable for use as intermediates for the manufacture of other valuable organic phosphorus derivatives.

Thus the present invention provides a process for the production of alkyl phosphorus dihalides which comprises forming a complex compound of an alkyl phosphorus dihalide and an aluminium halide in the manner described and thereafter reacting the said complex compound with a decomplexing agent for example a compound capable of forming a stronger complex union with the aluminium halide component of the said complex compound thereby removing the aluminium halide and liberating the alkyl phosphorus dihalide.

Compounds which are suitable for use as decomplexing agents in some cases are reactive organic compounds containing a tertiary nitrogen atom for example, triethylamine and pyridine. Benzyl cyanide may also be used.

An alternative method in accordance with the invention for the production of alkyl phosphorus dihalides from the aforesaid compounds comprises decomposing the complex compounds by controlled fluorination with a fluorinating agent for example hydrogen fluoride to liberate the alkyl phosphorus dihalide.

Phosphorus oxychloride is another useful reagent for decomplexing the complex compounds of alkyl phosphorus halides and aluminium halide.

The process according to the invention may be more readily understood from the following description given by way of illustration.

Methyl aluminium dichloride produced in known manner by the reaction of aluminium with methyl chloride and conversion of the product by reaction with aluminium chloride, is reacted with phosphorus trichloride to produce a complex compound of methyl phosphorus dichloride and aluminium trichloride. The reaction is indicated as follows:

$$CH_3AlCl_2 + PCl_3 \rightarrow CH_3PCl_2AlCl_3 \qquad (3)$$

Alternatively, an equimolecular mixture of methyl aluminium dichloride and dimethyl aluminium chloride produced by the reaction of aluminium and methyl chloride as indicated in equation (1) may be reacted with phosphorus trichloride to produce a complex compound of methyl phosphorus dichloride and aluminium trichloride in good yield. This method has the advantage that the equimolecular mixture can be used wtihout the conversion treatment with aluminium trichloride indicated in equation (2). The equimolecular mixture is known as the "sesquichloride."

Again, dimethyl aluminium chloride may be reacted with phosphorus trichloride to produce a complex compound of methyl phosphorus dichloride and aluminium trichloride.

Complex compounds of an alkyl phosphorus halide and aluminium trihalide can also be produced in an analogous manner from ethyl, n-propyl and n-butyl chlorides and bromides.

One method for the decomposition of methyl phosphorus chloride-aluminium chloride complex consists in subjecting the complex compound to controlled fluorination by hydrogen fluoride for the removal of the aluminium as fluoride and the liberation of methyl phosphorus chloride.

The reaction is indicated as follows:

$$CH_3PCl_2 \cdot AlCl_3 + 3HF \rightarrow CH_3PCl_2 + AlF_3 + 3HCl \qquad (4)$$

The aluminium fluoride is a useful by-product which may be used if desired, for the production of hydrogen fluoride or otherwise.

The following examples describe various methods by which the invention may be carried into practice:

EXAMPLE 1

Methylaluminium dichloride was prepared by adding anhydrous aluminium chloride (120 gms.) to the sesquichloride (177 gms.) and the mixture heated until all the aluminium chloride was in solution. The resulting product was distilled under reduced pressure and gave methylaluminium dichloride $CH_3AlCl_2$, (267 gms.), b.p. 97–100° C./100 mm.

This material (2.36 mols) was dissolved in 2500 ml. dry petrol i.e. petroleum ether, (b.p. 40/60° C.) and the petrol solution added gradually with good stirring to a solution of phosphorus trichloride (325 gms., 2.36 mols), in 500 ml. of petrol. As the addition proceeded the complex $CH_3PCl_2 \cdot AlCl_3$ began to separate out as a brown heavy oil. After completion of the addition the mixture was stirred overnight, allowed to settle and the lower heavy oil separated off. On distillation the petrol layer was found to contain only a very small amount of the complex.

The lower layer of complex was heated on the steam bath under vacuum (20 mm.) until free from petrol. The resulting product $CH_3PCl_2 \cdot AlCl_3$ weighed 586 gm. (2.34 mols).

A portion of the above complex (120 gm.) was added with cooling and good stirring to benzyl cyanide (250 ml.) kept at 20–25°. After standing overnight the mixture was distilled, collecting all distillate up to 120° C. A further small quantity was obtained by finishing the distillation under vacuum. The combined distillate was then redistilled giving methyl phosphorus dichloride $CH_3PCl_2$, b.p. 81–82° C., in 80% yield, calculated on the 586 gm. complex.

EXAMPLE 2

Redistilled dimethylaluminium chloride (b.p. 69°/113 mm.) (80 gm., 0.865 mol) was added gradually with vigorous stirring to phosphorus trichloride (713.5 gm., 5.19 mols) in an atmosphere of nitrogen, keeping the temperature at 0–10° C. The reaction is exothermic. It is essential to use very vigorous agitation to avoid high local concentrations of dimethylaluminium chloride, otherwise the reaction takes in part a different course and methane is evolved uncontrollably. At the end of the experiment the product was a fine white suspension in the excess phosphorus trichloride and was assumed to consist mainly of the complex $[CH_3PCl_2]_2AlCl_3$.

The excess of phosphorus trichloride was distilled off under nitrogen, taking the temperature of the oil-bath heating the flask up to 180° C. During the heating the white solid melted to a clear liquid. The colourless distillate consisted almost entirely of phosphorus trichloride.

On cooling the contents of the flask were treated with phosphorus oxychloride (266 gm., 1.73 mol, 2 mols/mol Al). This mixture was stirred vigorously and the methyl phosphorus dichloride distilled off, together with a quantity of $POCl_3$. Fractionation of the distillate gave 86 gm. (0.735 mol) $CH_3PCl_2$.

EXAMPLE 3

Methylaluminium sesquichloride (476 gms. 2.315 mol) was added gradually with vigorous stirring to phosphorus trichloride (2866 gms., 1821 ml., 20.85 mol) kept as nearly as possible at 10° to 50° C. After completion of the addition the mixture was allowed to stand overnight and the white solid complex filtered off. The filter cake was carefully washed with dry petrol (b.p. 40/60° C.), dried in vacuo, and weighed 1276 gms. The material was shown by analysis to be $[CH_3PCl_2]_3[Al_2Cl_6]$. A portion of this complex (100 gm.) was added, with stirring, to benzyl cyanide as in Example 1 and gave a distillate which on redistillation yielded methyl phosphoru dichloride $CH_3PCl_2$ 42 gm. 0.359 mol., b.p. 79–82°. This represents a yield of 65.9% based on sesquichloride, calculated on 1276 gm. complex.

What we claim is:

1. A process for manufacturing complex compounds of an aluminum halide and an alkyl phosphorus dihalide which comprises adding an alkyl aluminum halide to a phosphorus trihalide and agitating for a time sufficient to cause the mixture to react.

2. A process according to claim 1 wherein said alkyl aluminum halide is a monoalkyl aluminum dihalide.

3. A process according to claim 1 wherein said alkyl aluminum halide is a dialkyl aluminum monohalide.

4. A process according to claim 1 wherein said alkyl aluminum halide is a equimolecular mixture of a monoalkyl aluminum dihalide and a dialkyl aluminum monohalide.

5. A process for preparing complex compounds of aluminum chloride and an alkyl phosphorus dichloride comprising adding an alkyl aluminum chloride to phosphorus trichloride and agitating for a time sufficient to cause the mixture to react.

6. A process according to claim 5 wherein said alkyl aluminum chloride is an alkyl aluminum sesquichloride.

7. A process of manufacturing complex compounds of an aluminum halide and an alkyl phosphorus dihalide which comprises separately dissolving a phosphorus trihalide and an alkyl aluminum halide in a solvent which is inert under the conditions involved, gradually adding the solution of said alkyl aluminum halide to the solution of said phosphorus trihalide while agitating the last named solution, agitating for a time sufficient to cause the mixture to react while continuing the agitation and separating the reaction product from the solvent.

8. A process according to claim 7 wherein said solvent consists essentially of petroleum ether.

9. A process for manufacturing monoalkyl phosphorus dihalides which comprises adding an alkyl aluminum halide to a phosphorus trihalide and agitating for a time sufficient to cause the mixture to react, thereby forming a complex compound of an aluminum trihalide and an alkyl phosphorus dihalide; and then treating said complex compound with a decomplexing agent selected from the group consisting of pyridine, benzyl cyanide, triethylamine, hydrogen fluoride and phosphorus oxychloride to remove the aluminum halide and liberate the alkyl phosphorus dihalide.

10. A process for preparing a complex compound of aluminum chloride and methyl phosphorus dichloride which comprises mixing a methyl aluminum chloride with phosphorus trichloride and agitating for a time sufficient to cause the mixture to react.

11. A process according to claim 10 wherein the methyl aluminum chloride is methyl aluminum sesquichloride.

12. A process of preparing methyl phosphorus dichloride which comprises adding a petroleum ether solution of methyl aluminum chloride to a petroleum ether solution of phosphorus trichloride, agitating for a time sufficient to cause the mixture to react to produce a methyl phosphorus dichloride aluminum chloride complex, reacting the above complex with benzyl cyanide to break the complex and separating out the methyl phosphorus dichloride.

References Cited

UNITED STATES PATENTS 2,137,792   11/1938   Woodstock _____ 260—448

OTHER REFERENCES

Dye, Jr., J. Am. Chem. Soc., vol. 70, pp. 2595–96.

Kosolapoff, Organophosphorus Compounds, pp. 42–46 (1950), John Wiley and Sons Inc., New York (copy in Scientific Library).

LELAND A. SEBASTIAN, Primary Examiner

U.S. Cl. X.R.

260—448 R, 543 P